United States Patent [19]
Ward

[11] Patent Number: 5,577,534
[45] Date of Patent: Nov. 26, 1996

[54] LOAD SENSING PROPORTIONAL PRESSURE CONTROL VALVE

[75] Inventor: James R. Ward, Milwaukee, Wis.

[73] Assignee: Applied Power Inc., Butler, Wis.

[21] Appl. No.: 458,334

[22] Filed: Jun. 2, 1995

[51] Int. Cl.$^6$ ................................................ F15B 13/044
[52] U.S. Cl. .......................... 137/596.17; 137/625.65; 251/129.07
[58] Field of Search ...................... 137/596.17, 625.65; 251/129.07

[56] References Cited

U.S. PATENT DOCUMENTS

| | | | |
|---|---|---|---|
| 3,949,645 | 4/1976 | Masclet | 137/625.64 X |
| 3,995,652 | 12/1976 | Belart et al. | 137/102 |
| 4,267,862 | 5/1981 | Neff et al. | 137/625.64 |
| 4,478,250 | 10/1984 | Lukasczyk et al. | |
| 4,643,225 | 2/1987 | Imhof | 137/596 |
| 4,844,122 | 7/1989 | Ichihashi | |
| 5,011,113 | 4/1991 | Stobbs et al. | |
| 5,067,687 | 11/1991 | Patel et al. | |
| 5,069,420 | 12/1991 | Stobbs et al. | 251/30.02 |
| 5,178,359 | 1/1993 | Stobbs et al. | 251/30.02 |
| 5,186,093 | 2/1993 | Kervagoret | 91/433 |
| 5,234,030 | 8/1993 | Kervagoret et al. | 137/596.17 |
| 5,319,933 | 6/1994 | Omberg et al. | 60/426 |
| 5,328,147 | 7/1994 | Stobbs | 251/30.02 |
| 5,377,720 | 1/1995 | Stobbs et al. | 137/625.65 |

FOREIGN PATENT DOCUMENTS

| | | |
|---|---|---|
| 1231514 | 12/1966 | Germany. |
| 530564 | 12/1972 | Switzerland. |
| 970551 | 9/1964 | United Kingdom. |

OTHER PUBLICATIONS

Abstract of Japanese Pub. No. 60–157575, published Aug. 1985.

*Primary Examiner*—Gerald A. Michalsky
*Attorney, Agent, or Firm*—Quarles & Brady

[57] ABSTRACT

The spool of a fluid pressure control valve has an axial through-bore of a larger diameter at one end and a smaller diameter at the opposite end. A larger diameter pin is slidably received in the larger diameter end of the bore and a smaller diameter pin is slidably received in the smaller diameter end of the bore, and the pins are biased apart by a compression spring so as to be in abutment with the housing at both ends of the spool. Pressure from the outlet port is admitted into the through-bore of the spool between the pins so as to produce a feedback pressure force on the spool which is proportional to the value of the outlet pressure and the difference in area between the two pins.

4 Claims, 2 Drawing Sheets

2

LOAD SENSING PROPORTIONAL PRESSURE CONTROL VALVE

FIELD OF THE INVENTION

This invention relates to proportional pressure control valves and in particular to such valves which are provided with load sensing feedback control.

BACKGROUND OF THE INVENTION

Proportional pressure control valves which are provided with load sensing feedback control are well known. In such valves, the degree of communication between an inlet port and an outlet port is in part determined by an electrical signal applied to an electromagnetic coil for operating the valve and also by the pressure at the outlet port. Typically, a higher pressure at the outlet port tends to close off the passageway between the inlet port and the outlet port.

This is achieved by the outlet port pressure acting on a certain area of the valve control element, for example a spool, tending to move the element axially so as to choke off the passageway between the inlet port and the outlet port. The magnitude of the force exerted on the valve control element to move it axially is determined in part by the magnitude of the pressure, but also by the net area of the spool on which the pressure acts.

In the prior art, this area has been provided by forming a blind bore in the spool and providing a pressure feedback pin slidable in the open end of the blind bore on which the pressure acted. However, especially for large pressures, the net area on which the pressure acts is very important. In the prior art design, this area was determined by the diameter of the pin, and therefore, small areas, required for high pressures, required a small diameter pin, which also placed a constraint on the diameter of the bore in the valve element in which the pin was slidable, since that is essentially the same as the diameter of the pin in order to minimize leakage.

SUMMARY OF THE INVENTION

The present invention eliminates this constraint so as not to require small diameter pins, so as to provide a simple and economical means of providing a pressure feedback area on a valve element, and to allow for the setting of the feedback area at any value with any desired pin diameter. In a fluid pressure control valve of the invention, the spool has an axial through-bore in which a first portion at one end is of one diameter and a second portion at the other end is of a different diameter. A first pin is journaled in the first portion to slide axially therein relative to the spool and is slidable to a position in which it abuts the housing. A second pin is journaled in the second portion to slide axially and is slidable to a position in which it abuts the housing. A passageway admits pressure into the through-bore between the pins so as to act on the pins and urge them into abutment with the housing. Thereby, the difference in area of the pins yields the differential area on which the feedback pressure can act, and the pins can be made any desired diameter, so long as the difference in their areas results in the desired differential area.

Other objects and advantages of the invention will be apparent from the following detailed description and from the drawings.

DETAILED DESCRIPTION OF THE PREFERRED EMBODIMENTS

Figure 1:
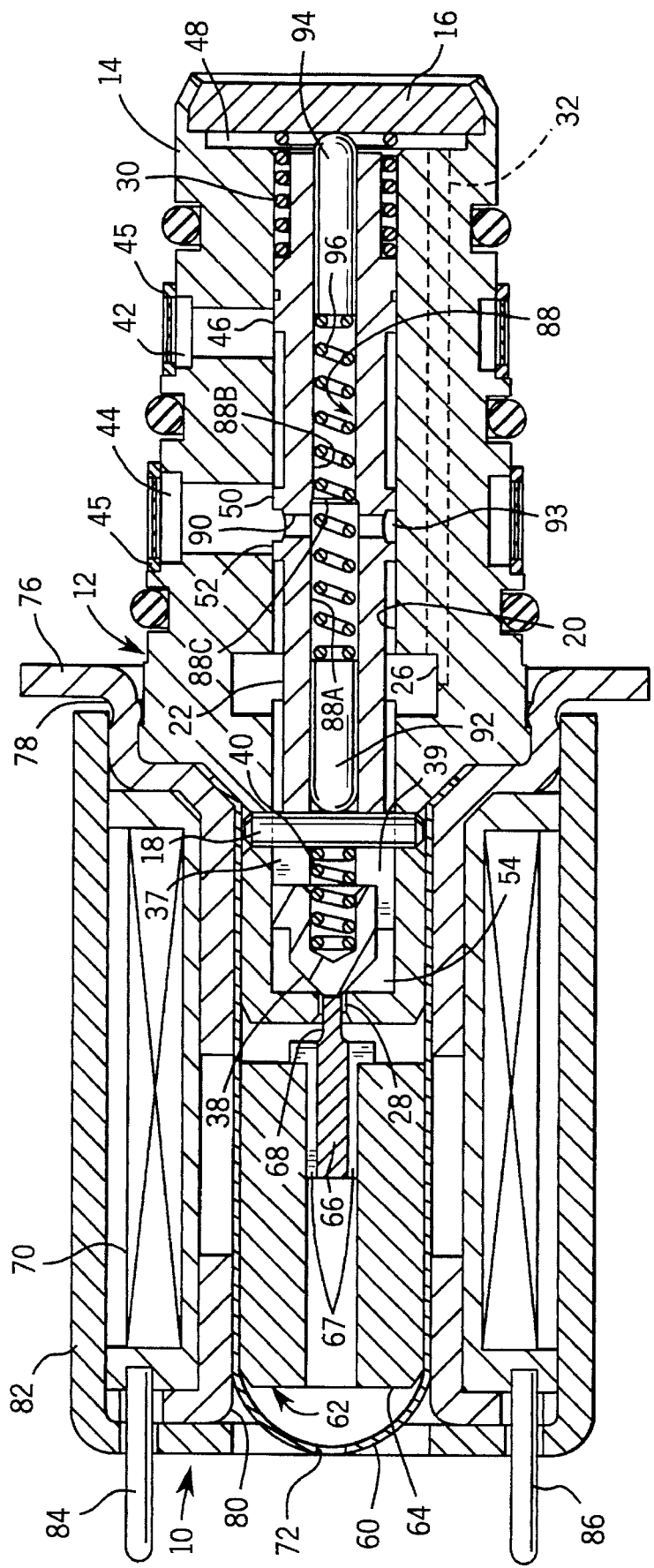
FIG. 1 is a cross-sectional view of a first embodiment of a valve incorporating the invention.

FIG. 1 illustrates a valve 10 of the invention which includes a housing 12 which may, for example, be made of steel. The housing 12 includes body 14, cap 16 and roll pin 18. The cap 16 is staked so as to be stationary with respect to the body 14 and roll pin 18 is pressed into a cross-bore through the body 14 so as to be stationary relative to the body 14.

The body 14 has an axial through-bore 20 in which a valve spool 22, also preferably steel, is axially slidable. The through-bore 20, in addition to including a main diameter section in which the spool 22 is axially slidable, includes an enlarged diameter section 26 and an orifice 28. The spool 22 is urged against pin 18 by a spring 30 which acts against cap 16 and a passageway 32 provides communication between one end of the through-bore 20 and the other end of the through-bore 20, via enlarged diameter 26, so as to equalize the pressure acting on the ends of the spool 22. A poppet 38 biased by spring 40 to close orifice 28 is also provided in the through-bore 20.

The body 14 also defines an inlet port 42 and an outlet port 44, which may be provided with screen filters 45 as shown. The spool 22 has a land 46 which prevents communication between inlet port 42 and the cap end chamber 48 of the bore 20 and also has a control land 50, the axial position of which determines the area of the passageway between the inlet port 42 and the outlet port 44. A third land 52 operates to determine the magnitude of communication between the outlet port 44 and the pin end chamber 54 of the bore 20.

A thin-walled (e.g., 0.010 inches thick) non-magnetic stainless steel spacer sleeve extends from the pin 18 end of the body 14, to which it is press-fit, and slidably receives an armature 62 which is made of a magnetic material such as iron or steel. The armature 62 includes a body 64 and a pusher 66. The body 64 has an axial through-bore in which is pressed or otherwise firmly affixed pusher 66, which is slotted at 67 so as to allow for the free flow of fluid through the body 64. The pusher 66 has a nose 68 which extends into orifice 28 with a clearance.

When coil 70 is energized, armature 62 is moved rightwardly as viewed in FIG. 1 so as to abut nose 68 against poppet 38 and thereby open orifice 28. Poppet 38 is slotted at 37, which is at its end adjacent to the spool 22, so as to straddle the pin 18 and have legs which extend on either side of pin 18 into abutment with the end of spool 22. Thus, further movement of armature 62 rightwardly pushes spool 22 rightwardly, through poppet 38, so as to close off the cross-sectional area of the flow passageway from inlet port 42 to outlet port 44. Poppet 38 also has an axial groove 39 to allow flow past the poppet 38.

Thus, since when coil 70 is off, spring 30 tends to open the passageway from port 42 to port 44, the valve 10 is a normally open valve. A tank port 72 is formed at the leftward end of sleeve 60, which communicates with tank pressure. Therefore, when the poppet 38 is opened, cap chamber 48 and pin chamber 54 communicate with tank pressure.

A first pole piece 76 (typically steel) is slid over the sleeve 60 and crimped to body 14, as shown at 78, which also helps secure the sleeve 60 to the body 14. Coil 70 is then assembled over the first pole piece 76, and a second pole piece 80 (also typically steel) is inserted between the sleeve 60 and the coil 70. A cover 82 is then assembled and suitably secured over the entire assembly, for example by being crimped to the pole piece 76. Leads 84 and 86 extend from the coil 70 out through the cover 82 for energizing the coil 70.

The sleeve 60 establishes a minimum gap between the armature 62 and the pole piece 80, which helps keep the armature 62 concentric with respect to the pole piece 80. This is very important to the proper movement of the armature 62 relative to the stationary parts of the valve 10, since magnetic effects are very dependent upon the size of this gap and the concentricity of the armature 62 relative to the pole piece 80. Also, it should be noted that the opposite magnetic pole is actually established by not only the first pole piece 76, but also by the left end of the body 14.

The spool 22 is hollow, having an axial through-bore 88 with a lateral bore 90 and peripheral groove 92 provided in the spool 22, which establishes communication between the through-bore 88 and the outlet port 44. The through-bore 88 has a larger diameter portion 88*a* at one end and a smaller diameter portion 88*b* at the other end. The step in the diameter occurs at 88*c*. At the end of the larger diameter portion 88*a*, a pressure feedback pin 92 is slidably received and at the opposite end of the smaller diameter portion 88*b*, a second pressure feedback pin 94 is slidably received. A spring 96 urges the pins 92 and 94 apart, so that the pin 92 abuts against the roll pin 18 and the pin 94 abuts against the cap 16.

The difference between the cross-sectional area of the pin 92, which is substantially the same as the area of the portion 88*a*, and the pin 94, which is substantially the same as the area of the portion 88*b*, is the differential area on which the feedback pressure from port 44 acts. Since this area is not dependent on the diameter of the pins 92 and 94, but rather is a function of both diameters, the pins 92 and 94 can be made in any desired range of diameters, so long as the difference between their areas is the desired differential area. Thus, since the larger diameter pin 92 is at the left of spool 22, the feedback pressure force, which is the product of the pressure and the differential area, tends to move the spool 22 rightwardly, so as to close off the area of the passageway between port 42 and port 44.

Figure 2:
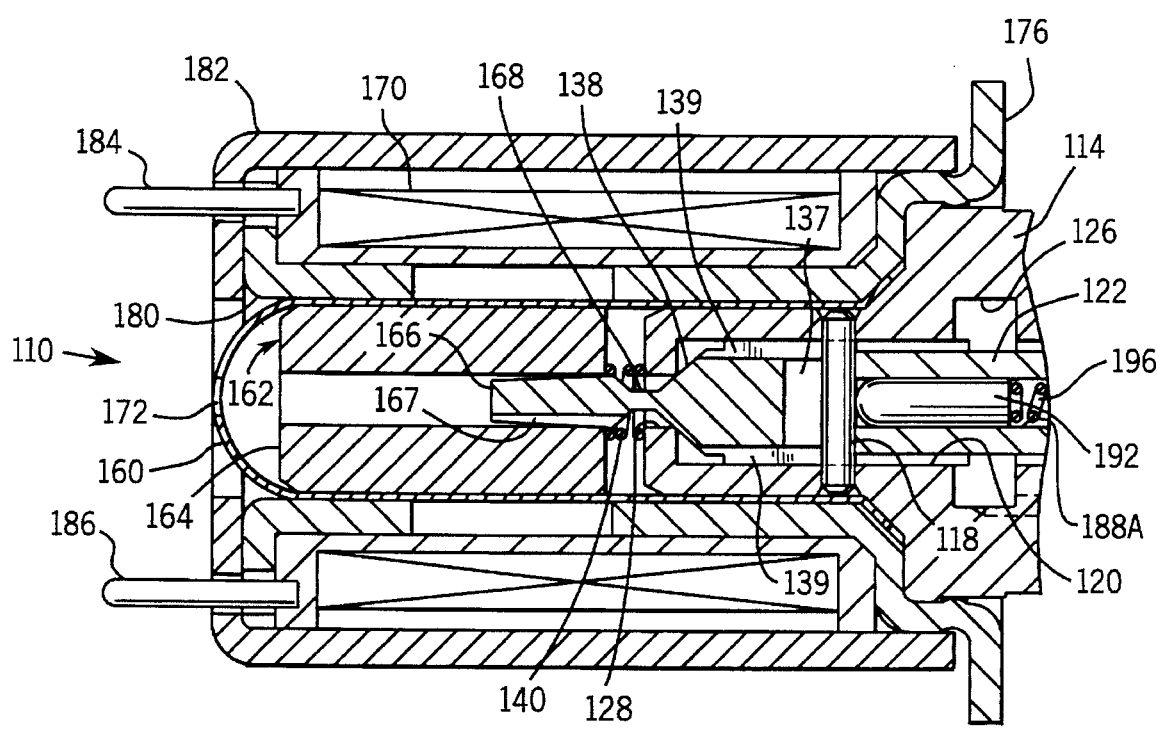
FIG. 2 is a fragmentary cross-sectional view of a second embodiment of a valve incorporating the invention.

FIG. 2 illustrates an alternate embodiment 110 of a valve of the invention. In the valve 110, elements corresponding to elements of the valve 10 have been identified by the same reference number, plus 100.

The valve 110 is identical in all respects to the valve 10, except for the structure of the poppet 138, the pusher 66 and the spring 140. In the valve 110, the poppet 138 and the pusher 66 are integral with one another, and the poppet biasing spring 140 acts between the end of the body 114 and the armature body 164. The poppet 138 is slotted at 137 so as to straddle the pin 118 and abut the end of the spool 122, and is axially grooved at 139 to allow flow past it. The pusher 166 is axially grooved at 167 and has a conically tapered outer periphery which is received in the bore of the armature body 164 with an interference fit. This design has the advantage of pulling the poppet 138 against its seat under the bias of spring 140 and seating the spring 140 against flat surfaces at both ends of the spring. This construction also insures fixation of the pusher 166 to the armature body 164 since each time the coil 170 is energized, the armature body 164 is jammed further onto the tapered periphery of the pusher 166.

Many modifications and variations to the preferred embodiments described will be apparent to those skilled in the art, which will still incorporate the invention. For example, the invention is not limited to a type of valve in which the ends of the spool bore are vented to tank only when the armature is energized, but the invention could be applied to any spool valve. In one of several possible arrangements, the pressure could be applied to a valve in which the armature acts directly on the spool and the ends of the spool bore are vented directly to tank without an intervening valve. Thus, the invention should not be limited to the embodiments described, but should be defined by the claims which follow:

We claim:

1. In a fluid pressure control valve of the type having a housing with a main bore and a valve spool slidable in said main bore to selectively vary the cross-sectional area of a flow passage between an inlet port for communication with a fluid pressure source and an outlet port opening for communication with a fluid pressure load, the improvement wherein:

said spool has an axial through-bore, said through-bore having a first portion at one end which is of a larger diameter and having a second portion at the other end of a smaller diameter;

a first pin of a diameter for close sliding in said first portion is journaled in said first portion to slide axially therein relative to said spool, said first pin being slidable to a position in which it abuts said housing;

a second pin of a diameter smaller than said first pin for close sliding in said second portion is journaled in said second portion to slide axially therein relative to said spool, said second pin slidable to a position in which it abuts said housing; and a passageway is provided in said spool for admitting pressure into said through-bore between said pins so as to act on said pins and urge said pins into abutment with said housing irrespective of the axial position of said spool so as to urge the larger of said two pins against said housing with a greater force than the smaller of said two pins in proportion to the pressure acting on said pins.

2. The improvement as claimed in claim 1, wherein said passageway communicates said outlet port with said through-bore.

3. The improvement as claimed in claim 2, wherein said valve further comprises a tank pressure port and means for communicating said outlet port with said tank pressure port.

4. The improvement as claimed in claim 1, wherein a compression spring extends between said pins and biases them apart.

\* \* \* \* \*